United States Patent [19]

Yoshimoto et al.

[11] Patent Number: 5,363,777
[45] Date of Patent: Nov. 15, 1994

[54] WASTE HEAT TREATMENT APPARATUS

[75] Inventors: Katsunobu Yoshimoto; Masayoshi Hatta; Toshio Kumondai, all of Kyoto, Japan

[73] Assignees: Towa Corporation; Shashin Kagaku Co., Ltd.; Kabushiki Kaisha I.K.S, all of Kyoto, Japan

[21] Appl. No.: 942,975

[22] Filed: Sep. 10, 1992

[30] Foreign Application Priority Data

Sep. 11, 1991 [JP] Japan .................. 3-261173

[51] Int. Cl.5 ............................................. F23B 5/00
[52] U.S. Cl. ................................. 110/214; 110/216; 110/241
[58] Field of Search ............... 110/210, 211, 212, 214, 110/241

[56] References Cited

U.S. PATENT DOCUMENTS

| | | | |
|---|---|---|---|
| 4,330,503 | 5/1982 | Allaire et al. | 110/214 |
| 4,458,662 | 7/1984 | Barnett | 110/214 |
| 4,466,358 | 8/1984 | Christian | 110/214 |
| 4,579,069 | 4/1986 | Gray et al. | 110/216 |
| 4,665,889 | 5/1987 | Rumens et al. | 110/214 |
| 4,870,910 | 10/1989 | Wright et al. | 110/214 |
| 5,170,724 | 12/1992 | Mogi | 110/241 |
| 5,237,938 | 8/1993 | Fujimori et al. | 110/241 |

FOREIGN PATENT DOCUMENTS 64-58910  3/1989  Japan .
1-196411  8/1989  Japan .

*Primary Examiner*—Henry C. Yuen
*Attorney, Agent, or Firm*—W. G. Fasse; W. F. Fasse

[57] ABSTRACT

A waste heat treatment apparatus includes a waste accommodating chamber for holding and burning waste placed in the chamber which is positioned in an outer housing that also holds a recombustion section for after burning the burning gas. An ash pan collects waste after the burning and/or after a sterilization for removal from the outer housing. An exhaust fan exhausts the burning gas out of the outer housing. A catalyzer is positioned in a gas passage between the recombustion section and the exhaust fan. The waste accommodating chamber includes a heater for burning the waste, and the recombustion section includes a further heater for after burning the gas generated by the burning. This structure provides a relatively simple device which is compact and portable, whereby installation near the spot where the waste is produced, is facilitated.

12 Claims, 2 Drawing Sheets

WASTE HEAT TREATMENT APPARATUS

FIELD OF THE INVENTION

The present invention relates to a waste heat treatment apparatus and, more specifically, it relates to a waste heat treatment apparatus for making harmless or sterilizing domestic and industrial wastes, kitchen refuse, combustible wastes, medical wastes including disposed equipment such as injectors, portions excised from patients by operations and so on (hereinafter these are generally referred to as "materials to be treated") in a simple manner, so that these materials can be disposed immediately.

BACKGROUND INFORMATION

Conventional waste heat treatment devices include batch furnaces in which wastes are burned intermittently, and continuous feed incinerators in which wastes are successively moved in the furnace by means of a belt so that the wastes are burned continuously. In either type of the incinerators, wastes are burned and disposed by the heat of burning gas fuel or liquid fuel in a burner. These conventional waste incinerators are advantageous in that many different wastes can be treated at one time. Conversely, since a large volume of waste is burned at one time and a burner is used, the incinerators inevitably have a complicated structure and a large size, which leads to higher installation costs.

In addition, since it is large, conventional devices of this type are very difficult to move conventional heat treatment devices, and it is hard to install these devices close to where such wastes are generated. The wastes must be transported to a distant incinerator. Where the materials to be treated include medical wastes and the location where such wastes are produced is far from the incinerator, it has been pointed out that persons who treat the medical waste may possibly be infected by pathogenic bacteria or the like included in the medical waste while transporting the medical waste to the incinerator.

An incinerator which burns various wastes indirectly by microwave and makes the wastes harmless by radiating microwave into the burning gas generated by burning has been proposed, for example, in Japanese Patent Laying -Open No. 64-58910, as another example of the conventional waste heat treatment apparatus which does not use a burner for burning the waste.

Referring to FIG. 1, the waste incinerator proposed in the aforementioned patent application includes a combustion chamber 1 divided into a primary combustion chamber 3 and a secondary combustion chamber 4 by a microwave attenuating portion 2. A waste carrier 5 is provided in the primary combustion chamber 3. A microwave heater 6 is provided on a side surface of the waste carrier 5. The primary combustion chamber 3 is connected to a magnetron 7 by means of a waveguide 8 with a microwave transmitting body 9 provided at the connection between the primary combustion chamber 3 and the waveguide 8. Thus the burning gas is prevented from entering the waveguide 8, thereby protecting the magnetron 7. A plurality of primary air inlets 10 are provided in the primary combustion chamber 3.

A plurality of secondary air inlets 11 and an igniter 12 are provided in the secondary combustion chamber 4 so as to ignite and burn the inflammable gas fed from the primary combustion chamber 3 into the secondary combustion chamber 4. On the downstream side of the secondary combustion chamber 4, a catalyzer chamber 13 is provided. A catalyzer 14 and a filter 15 are contained in the chamber 13. The catalyzer 14 is kept at a temperature that maintains the catalyzer is maintained, by means of a catalyzer heater 16. The burning gas is purified by the catalyzer 14 and the filter 15 and exhausted through an exhaust tube 17.

The operation of the conventional microwave type waste incinerator having the above described structure is as follows. When waste 20 introduced through an outer door 18 and an inner door 19 and placed on the waste carrier 5, is irradiated with microwave, the microwave energy is entirely absorbed by the waste 20, the water in the waste 20 is evaporated, and the waste 20 is dried quickly. After the waste 20 is fully dried the microwave energy begins to heat the microwave heater 6. The temperature of the microwave heater 6 gradually increases, and the heater heats the waste 20 which is in contact with the microwave heater 6 thereby promoting carbonization of the waste 20 while generating inflammable gases from the waste 20. The inflammable gases generated from the waste and the dried waste itself are ignited and burned by discharge of heat into the carbonized waste 20 or by the inginter 12 provided in the secondary combustion chamber 4.

The above described waste incinerator utilizing microwave has the following problems.

First, the temperature control for the burning is difficult in the incinerators utilizing high frequency or microwave energy, causing malfunctions. Further, the generated microwave energy may adversely affect, the control mechanism of the incinerator itself resulting in a malfunction, or instruments of other devices may be adversely affected by the microwave energy.

SUMMARY OF THE INVENTION

It is an object of the present invention to provide a waste heat treatment apparatus for making materials to be treated harmless in a simple and certain manner or by sterilizing the material to be treated near right where the waste is generated to allow for an immediate disposal. The present device shall be compact, portable and inexpensive.

The above described object is attained by the waste heat treatment apparatus of the present invention including a waste accommodating chamber inside in an outer housing; a recombustion chamber communicating with the waste accommodating chamber for recombustion of burning gas; means for introducing waste into the waste accommodating chamber; drawing means for removing the waste after the heat treatment out of the outer case; an exhaust for exhausting burning gas which has been generated in the waste accommodating chamber and passed through the recombustion chamber, out of the outer case; and a catalyzer attached to the communicating chamber between the recombustion chamber and the exhaust. This apparatus is characterized by a heater for heat treating the waste in the waste accommodating chamber and by a heater for recombustion of the burning gas in the recombustion portion.

In the apparatus having the above described structure, the waste held in the waste accommodating chamber is first heated, burned and/or sterilized by a heater provided for heating the waste accommodating chamber. The burning gas generated during burning of the waste is fully burned in the recombustion chamber and made harmless and odorless while passing over the catalyzer to be forcedly discharged out of the outer case by the exhaust.

In the present incinerator heaters are used as a heat emitting body for burning and/or sterilizing the waste, whereby the structure is not complicated compared with the aforementioned conventional apparatus in which wastes are burned by utilizing microwave, and accordingly the apparatus as a whole can be easily made compact. As a result, the apparatus can be easily moved.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
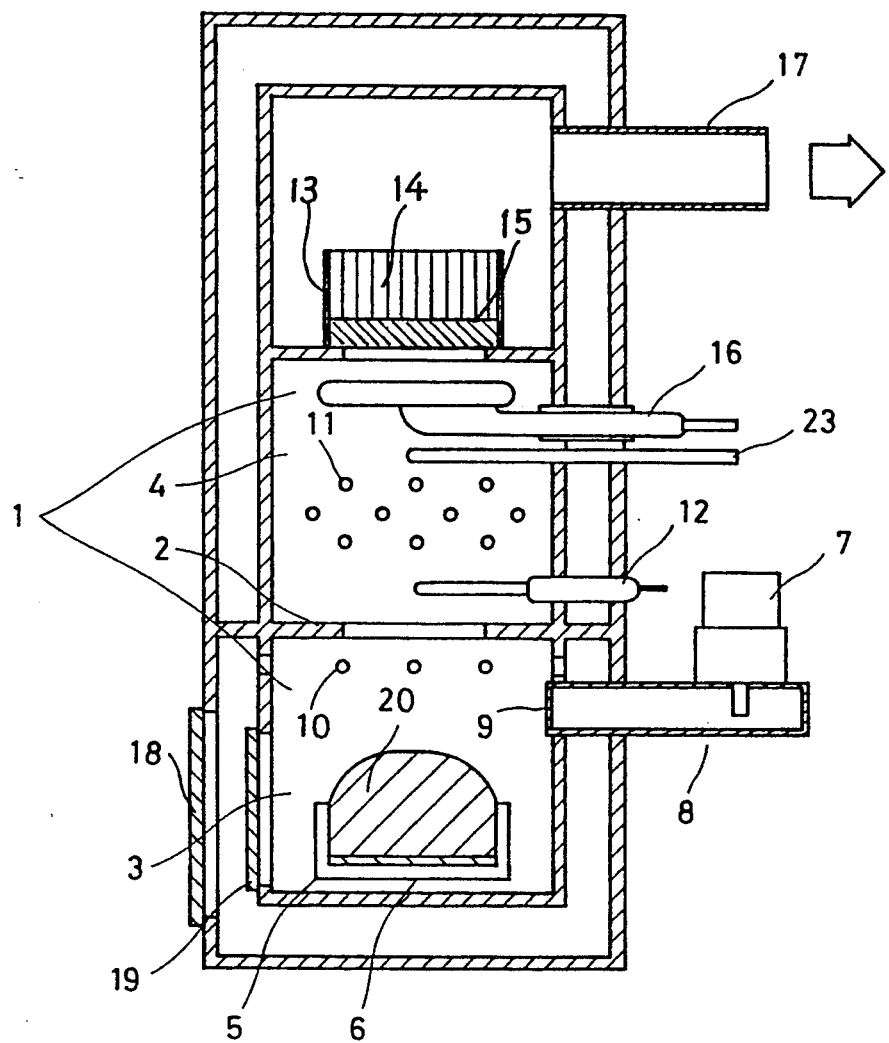
FIG. 1 is a cross sectional side view of a conventional waste heat treatment apparatus in which wastes are burned by using microwaves.
Figure 2:
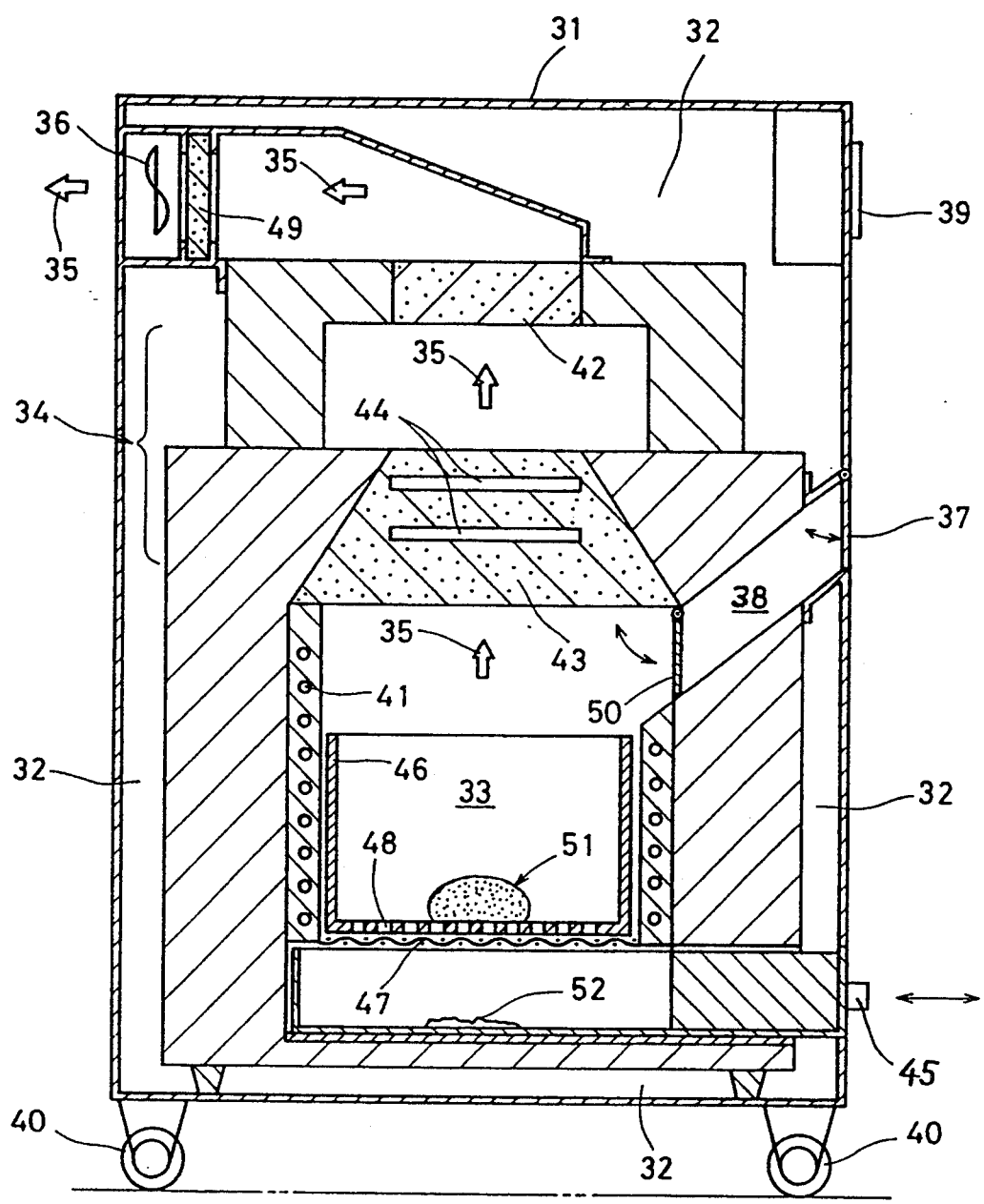
FIG. 2 shows a cross sectional structure of the waste heat treatment apparatus in accordance with one embodiment of the present invention.

Referring to FIG. 2, the waste heat treatment apparatus of the present invention includes an outer housing 31, a waste accommodating chamber 33 forming a first combustion chamber in the outer case housing 31 spaced by a gap 32 from the wall inner surface of the outer housing 31, and a recombustion section forming a second combustion chamber for gas generated in the first chamber 33 communicating with the waste accommodating chamber 33. Although not shown in FIG. 2, a prescribed air inlet or an air blower is provided in the waste accommodating chamber 33, whereby air necessary for burning is supplied to the waste accommodating chamber 33.

The outer housing 31 may have a parallelepiped shape with the top and bottom surfaces being a square of about 900 mm×900 mm and with the height of about 1200 mm. Since the apparatus is small, it does not require match space for its installation, and it can be moved relatively easily.

A fan 36 forms an exhaust for forcibly exhausting the burning gas 35 generated in the waste accommodating chamber 33 is provided at an upper portion of the outer housing 31. A waste inlet 38 as a waste introducing means with a lid 37, and an operating mechanism 39 of the apparatus are provided on the front surface of the outer housing 31. At four corners of the outer housing 31, casters 40 for facilitating movement of the apparatus attached.

A first heater 41 is arranged for heat treating the waste in the chamber 33. The first heater 41 includes a resistance wire for emitting heat at a high temperature. The heater wire is made of an alloy having the composition of, for example, Al (6.0%), Cr (23%) and the remainder is Fe. The heater wire is held by a sidewall of the waste accommodating chamber 33. By supplying electric power to the resistance wire, the waste accommodating chamber 33 can be heated to about 1500° C.

A catalyzer 42 is detachably secured in the passage between the fan 36 and the second recombustion or after burner chamber 34. A catalyzer capable of removing foreign matter included in the burning gas 35 is selected as the catalyzer 42.

A ceramic filter 43 for removing small particles included in the burning gas 35 generated during the burning of the waste 51 and a second heater 44 for recombustion and fully burning the burning gas 35 which has passed through the ceramic filter 43 are provided in the recombustion or after burner chamber 34.

A resistant wire formed of the same or similar material as is used for the heater 41 for heat-treating the waste, may be used as the second heater 44 for recombustion. The heater 44 embedded in the ceramic filter 43 and emits heat when electric power is supplied to the heater 44.

An ash box 45 for removing ash or residue 52 remaining after burning the waste material 51, out of the outer housing 31, is provided below the waste accommodating chamber 33 in the outer case 31. The ash box means 45 is fitted detachably and slidably in the horizontal direction so that it can be pulled out of the housing 31 from the front surface of the housing 31 below the waste accommodating chamber 33.

The materials to be treated or wastes 51 are placed on or in a waste pan 46 forming the waste accommodating chamber 33. The waste pan 46 is placed on a support net 47 forming the bottom of the waste accommodating chamber 33. The pan 46 is formed of a heat insulating material. The upper portion of the waste pan 46 is open so that the materials to be treated introduced through the waste inlet 38 can be received in the pan. A plurality of through holes 48 are provided in the bottom of the waste pan 46 so that after the heat treatment the residue 52 can fall through the holes 48 and through the support net 47 into the ash box 45. The shape of the opening of the through holes 48 is determined taking into consideration the roughness of the particles of the residue 52 after heat treatment, in accordance with the types of treatment of the wastes.

A filter 49 is detachably mounted immediately in front or upstream of the fan 36 as viewed in the gas flow direction 35. The filter 49 is provided as needed, to remove foreign matter remaining in the burning gas 35 which has passed through the catalyzer 42 as shown in FIG. 2.

A lid 50 is provided between the waste accommodating chamber 33 and the waste inlet 38, and accordingly, the incinerator has double doors, that is, the lid 50 and the lid 37 at the front surface of the outer case 31. The burning of waste in the waste heat treatment apparatus in accordance with the present embodiment will now be described.

Before introducing the materials 51 to be treated into the waste accommodating chamber 33, the switch of the heater 41 is turned on for pre-heating the waste accommodating chamber 33. Thereafter, the material 51 to be treated is put in through the waste inlet 38 into the waste pan 46 forming the waste accommodating chamber 33. Thereafter, the waste 51 in the waste pan 46 is heated and burned by heat from the heater 41. The burning gas 35 generated during heating and burning of the waste 51 is exhausted outside of the outer case 31 by the exhaust including the fan 36. At this time, the burning gas 35 has small particles included therein. These particles are removed while the gas passes through the heated ceramic filter 43. The burning gas 35 which has passed through the ceramic filter 43 is fully burned by the recombustion or second heater 44. Therefore an, inflammable gas component does not remain in the burning gas 35 which has passed the recombustion or second heater 44.

Harmful components and components generating odor are removed from the burning gas 35 which has passed the recombustion heater 44, while the gas passes through the catalyzer 42, and the resulting purified gas which is harmless and odorless, is discharged outside the outer housing 31.

The residue 52 left after burning the waste 51 falls through the holes 48 and the support net 47 of the waste pan 46 and collected in the ash pan 45. Therefore, the residue 52 can be taken out of the outer housing 31 to be disposed, by pulling the ash pan 45 out of the front surface of the outer housing 31.

In the above description, the operation of fully burning the waste by using the waste heat treatment apparatus of the present embodiment has been described. The present invention can also be used for sterilization i.e., heating or burning the waste to such a extent that the waste can be deposited as industrial waste, whereby fully incinerating the waste is not necessary. The waste sterilizing operation by the present apparatus will be briefly described.

First, by heating and burning the material 51 to be treated by the heater 41, the material 51 is turned into a fluid which falls through the holes 48 and the net 47 is collected in the pan 45. The material or residue 52 in the pan 45 has been sterilized by heating and burning, and therefore it can be deposited as industrial waste.

If material which cannot be turned into a fluid but remains in the original shape even if it is heated or burned is to be treated, a waste pan 46 which can be detachably attached to the outer housing 31 may be employed, so that the waste pan 46 as well as the waste 51 can be drawn out of the outer housing 31, and it can be disposed as industrial waste.

As described above, the present apparatus can be used for a full incineration, or for sterilizing the material. Therefore, if "full incineration" is restricted or limited by regulations of the area where the present apparatus is used, the apparatus can be used for sterilization without a full incineration. Further, "sterilization" requires less time for the heat treatment than a "full incineration". For example, a sufficient sterilization can be achieved by a heat treatment at about 250° C. for about 15 to 20 minutes. Therefore, the amount of heat emitted to the atmosphere during heat treatment can be reduced as compared with a full incineration, which meets the demand that the "atmospheric temperature" should not be increased.

The waste heat treatment apparatus in accordance with the present embodiment which has the above described structure and operated in the above described manner is relatively small and it can be easily moved as a portable device Therefore, it can be installed near the spot where the waste is generated. Accordingly, it can be installed for example, in a hospital where medical wastes are produced. Bottles, plastic packages pistons, cylinders, and certain syringe needles, blood collecting equipment, bodies of laboratory animals, portions excised by operations, sanitary gowns, linens and gauzes, and so on are included in the medical wastes coming from a hospital. However, incombustible wastes such as syringe needles made of stainless steel cannot be burned but they can be sterilized. The stainless needles and the like treated in the incinerator of the present embodiment become fragile and are easily destroyed. Even if the original shapes are maintained, they can be disposed in the similar manner as other industrial wastes, since they are sterilized. This is very important because a large quantity of "throw-away" materials is being used today.

A cylinder for an injector as the material 51 to be treated was fully burned to to form a small quantity of ash, and the needle for the injector was oxidized and softened, when the temperature of the waste accommodating portion 33 was set at 1000° C. and the wastes were burned for 15 to 30 seconds.

The present invention is not limited to the above described embodiment and various modifications and changes may be made as needed within the scope of the present claims.

For example, in the above embodiment, a gap 32 is provided between the outer housing 31 and the waste accommodating chamber 33 and between the outer housing and the recombustion section 34 for the burning gas to effect heat insulation, so that transmission of heat from the waste containing chamber 33 to the outer housing 31 is suppressed. In order to enhance such heat insulating effect, the waste accommodating chamber 33, the recombustion section 34, the fan 36, the waste inlet 38 and the ash pan 45 for the burnt residue may have double wall structure, or they may be made of a heat insulating material. Ceramic fiber mainly composed of alumina and silica may be used as the heat insulating material.

As described above, according to the waste heat treatment apparatus of the present invention the waste material is heated by the heater, and the burning gas generated during burning is fully after burned and made harmless and odorless to be forcedly discharged to the outside by the exhaust fan 36. Therefore, the materials to be treated can be surely and easily made harmless, allowing for an immediate disposal. In addition, possible problems of air pollution caused by the burning gas have been be prevented.

Since a heater is used as a heat emitting body for heating the waste material, the structure of the apparatus is relatively simple and the whole apparatus is made compact as compared with the incinerators using microwaves. This provides a superior practical effect of lower costs and easier handling.

In addition, by the apparatus of the present invention, unlike the conventional apparatuses using microwaves for heating, harmful radiowaves or electromagnetic waves are not generated, and therefore the apparatus of the present invention does not affect other electronic equipments.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for heat treating waste material, comprising a housing (31), a first combustion chamber (33) for accommodating waste material in said housing, means (37, 38, 50) for introducing waste into said first combustion chamber (33), an after burner second combustion chamber (34) in said housing, a first flow passage communicating said first and second combustion chambers (33, 34) with each other, a ceramic filter (43) and a heater (44) in said ceramic filter (43) forming a unit positioned in said first flow passage between said first and second combustion chambers, a gas exhaust in said housing, a second flow passage in said housing communicating said second combustion chamber (34)

with said gas exhaust, a catalyzer (42) in said second flow passage between said second combustion chamber (34) and said gas exhaust, means for removing ash from said housing, and wherein said first combustion chamber (33), said ceramic filter and heater unit (43, 44), said second combustion chamber (34), said catalyzer (42), and said exhaust are arranged in series with each other for exhausting gas generated in said first combustion chamber.

2. The waste heat treatment apparatus according to claim 1, wherein a gap is provided at least between said housing and said waste accommodating first combustion chamber.

3. The waste heat treatment apparatus according to claim 1, wherein said waste accommodating first combustion chamber includes air intake means for supplying air necessary for burning waste in said first combustion chamber.

4. The waste heat treatment apparatus according to claim 1, wherein said housing forms and outer casing having a parallelepiped shape.

5. The waste heat treatment apparatus according to claim 1, wherein said exhaust includes an exhaust fan attached near an exhaust opening provided in said housing.

6. The waste heat treatment apparatus according to claim 1, wherein said means for introducing waste includes an inlet path (38) connecting a first opening in said housing and a second opening in said first combustion chamber, and a lid for each of said first and second openings.

7. The waste heat treatment apparatus according to claim 1, including casters for movement attached near four corners of a bottom of said housing.

8. The waste heat treatment apparatus according to claim 1, comprising a plurality of through holes formed in a bottom of said first combustion chamber for letting residue waste after burning pass through said holes for collection by said ash removing means.

9. The waste heat treatment apparatus according to claim 8, wherein said bottom of said first combustion chamber is a support net, said openings being formed in said support net having a suitable mesh size, said net bottom being positioned between said first combustion chamber and said ash removal means.

10. The waste heat treatment apparatus according to claim 1, wherein said ash removal means includes a burnt residue pan which can be drawn out of said housing by a sliding movement in an approximately horizontal direction.

11. The waste heat treatment apparatus according to claim 5, wherein said exhaust includes a filter upstream of said exhaust fan as viewed in a gas flow direction.

12. The waste heat treatment apparatus according to claim 1, wherein said catalyzer is detachably attached in said second flow passage between said second combustion chamber and said exhaust.

* * * * *

UNITED STATES PATENT AND TRADEMARK OFFICE
CERTIFICATE OF CORRECTION

PATENT NO. : 5,363,777

DATED : November 15, 1994

INVENTOR(S) : Yoshimoto et al.

It is certified that error appears in the above-identified patent and that said Letters Patent is hereby corrected as shown below:

On title page, under [56] References Cited, please replace "4,579,069 4/1986 Gray et al." by --4,579,069 4/1986 Gay et al.--;

Column 2, line 4, replace "is maintained" by --active--,

Column 2, line 12, after "microwave" insert --energy--, line 32, after "affect" delete --,--, Column 4, line 59, replace "case" by --housing--, Column 5, line 54, before "Therefore" insert --.--, Signed and Sealed this Twenty-first Day of February, 1995

Attest:

BRUCE LEHMAN

*Attesting Officer*   *Commissioner of Patents and Trademarks*